(12) United States Patent
Rios (10) Patent No.: US 6,873,611 B2
(45) Date of Patent: Mar. 29, 2005

(54) MULTIPROTOCOL WLAN ACCESS POINT DEVICES

(75) Inventor: Carlos A Rios, Los Gatos, CA (US)

(73) Assignee: Nextwlan Corporation, Los Gatos, CA (US)

( * ) Notice: Subject to any disclaimer, the term of this patent is extended or adjusted under 35 U.S.C. 154(b) by 6 days.

(21) Appl. No.: 10/334,747

(22) Filed: Dec. 31, 2002

(65) Prior Publication Data

US 2004/0125775 A1 Jul. 1, 2004

(51) Int. Cl.[7] .............................................. H04L 12/28
(52) U.S. Cl. ................................... 370/338; 370/395.5
(58) Field of Search ................................ 370/338, 328, 370/465, 466, 395.5

(56) References Cited

U.S. PATENT DOCUMENTS

| | | | |
|---|---|---|---|
| 6,522,881 B1 * | 2/2003 | Feder et al. | 455/437 |
| 6,659,947 B1 * | 12/2003 | Carter et al. | 600/300 |
| 6,661,360 B2 * | 12/2003 | Lambert | 341/131 |
| 6,678,535 B1 * | 1/2004 | Narayanaswami | 455/557 |
| 2003/0185233 A1 * | 10/2003 | Ji et al. | |

* cited by examiner

Primary Examiner—Kenneth Vanderpuye
(74) Attorney, Agent, or Firm—Intellectual Property Law Group LLP; Otto O. Lee; Juneko Jackson (57) ABSTRACT

The present invention consists of a device-internal data flow organization coupled with a wireless communications medium access control protocol for a set of WLAN "Multiprotocol Devices", each containing a 2.4 and 5 GHz frequency band-agile CCK and OFDM modulation capable radio, such that the devices may support simultaneous 802.11a and 802.11b/g-compliant Access Point functionality. The set includes a "Multiprotocol Access Point" that bridges communications from 802.11a and/or 802.11b/g compliant WLAN client devices, and other Multiprotocol Devices, to the wired LAN distribution system. Also included is a "Multiprotocol Repeater" that relays communications from the above client and Multiprotocol devices wirelessly to another Multiprotocol Device. Lastly, the set includes a "High Capacity Multiprotocol Repeater" that can relay a higher volume of communications from 802.11a, b or g devices wirelessly to another Multiprotocol Device.

5 Claims, 5 Drawing Sheets

MULTIPROTOCOL WLAN ACCESS POINT DEVICES

TECHNICAL FIELD

The present invention generally relates to the field of computer networking. More particularly, the present invention relates to the field of wireless networking communications between computing devices.

BACKGROUND INFORMATION

Various communications systems are used to allow electronic devices such as computers to communicate and exchange data and other types of information. For example, various systems such as Local Area Networks ("LANs"), the Internet and conventional telephone networks often link computers. A particularly effective method to allow mobile computers to communicate is with a Wireless Local Area Network ("WLAN"). A very popular and pervasive WLAN system is that specified by the IEEE 802.11 wireless networking standard, referred to henceforth in this document simply as the 802.11 standard, an industry protocol that has successfully resolved many interoperability issues among the manufacturers of WLAN equipment. The 802.11 standard specifies several distinct OSI Physical ("PHY") Layer radio transmission mechanisms whereby signals may be transmitted over the wireless medium, as well as a single Medium Access Control ("MAC") layer that organizes and controls the exchange of data packets or datagrams between the communicating stations. This IEEE 802.11-19979 MAC, henceforth referred simply as the 802.11 MAC, also supports mechanisms whereby special IEEE 802.11 compliant wireless stations, henceforth referred to simply as 802.11 stations, called Access Points ("APs") also connect to a wired LAN, to then in many occasions traverse said LAN and access the broader Internet. Mobile computers connect to the Access Points wirelessly using 802.11 WLAN Network Interface Cards ("NICs") that plug in to their standard computer I/O connections (such as USB, PCI or CardBus).

Two specific IEEE 802.11 PHY standards (specifically. IEEE 802.11a and IEEE 802.11b, henceforth called 802.11a and 802.11b, respectively) have gained overwhelming worldwide acceptance. The 11 Mbps 802.11b PHY, operating at 2.4 GHz and employing Complementary Code Keying ("CCK") single carrier QPSK modulation, has been shipped in millions of NICs and APs since 1999. The 54 Mbps 802.11a PHY, operating in the 5 GHz band and based on multiple carrier Orthogonal Frequency Division Multiplex ("OFDM") signaling, is, on the other hand, rapidly gaining wide acceptance for large company WLAN deployments. To complicate matters further, the IEEE is standardizing a combined CCK and OFDM-based extension to the 2.4 GHz 802.11b PHY called IEEE 802.11g, currently in draft form and henceforth referred to as 802.11g, and corresponding combined 802.11b and 802.11g, or "802.11b/g" IC and software technology, and products have begun to ship.

One emerging, popular approach is to use dual band, multiple protocol WLAN equipment. Some IC vendors have begun to ship "802.11abg" chipsets and associated software that enable wireless stations to transmit and receive using either 802.11a or 802.11b/g on a datagram by datagram basis. This technology is presently being used to manufacture "Multiprotocol NICs" ("MPNICs") that can auto-negotiate and communicate with an AP using either 802.11b. 802.11g or 802.11a at any given time. As an important note, these new "multilingual" NICs also incorporate the exact 802.11-1997 MAC protocols in order to not confuse any legacy devices with which they would communicate.

Legacy (single band, single protocol) APs currently, are nearly 100% 802.11b-based and can only communicate using CCK at 2.4 GHz. "Dual Single Protocol APs" ("DSPAPs", consisting of two individual 802.11a and 802.11b APs in one enclosure sharing a common Ethernet connection to the LAN distribution system) however, are now being manufactured that can, effectively, simultaneously "talk" CCK at 2.4 GHz and OFDM at 5 GHz, again using the common 802.11-1997 MAC.

The evolution from 2.4 GHz CCK-based 802.11b technology to 5 GHz OFDM 802.11a-based equipment, therefore, involves serious, compatibility, interoperability and legacy support issues, and both WLAN equipment manufacturers and systems deployers are still grappling with how best to resolve them.

Once such a "single 802.11abg radio, earns 802.11 MAC" Multiprotocol Access Point ("MPAP") proves feasible, a new type of AP-like device that takes advantage of both the frequency agility and the Multiprotocol capabilities of the MPAP technology also becomes viable, if nat compelling. This new device a "Multiprotocol Repeater" ("MPR") replaces the MPAP's wired LAN connection with an(other) 802.11a or 802.11b/g link that would, in turn, communicate with an "upstream" MPAP provisioned wit the actual connection to the wired LAN or Internet. Multiple protocol repeaters could be implemented using three or four (!) distinct legacy single protocol 802.11a and 802.11b/g APs, but the invention documented herein provides for implementation of MPR devices that specifically make use of 802.11abg radio technology to provide significantly reduced cost and complexity.

While the above solution works acceptably well, it is a very costly disadvantage to require incorporation of two independent single protocol APs (incorporating separate 802.11a and 802.11b/g radios and MAC processors, and incurring much duplication of costly support circuitry) in order to produce a single dual protocol AP. It would be much more cost-effective to utilize a single 802.11abg-capable radio device for these new "802.11a plus 802.11b/g" APs as well. And of course, it is essential that any such devices incorporate the 802.11-1997 MAC unchanged. The present invention accomplishes all these objectives.

In the above fashion the new MPNICs can communicate with the common legacy 802.11b-only AN, the newer (and very rare) 802.11a-only APs or the increasingly popular "802.11a plus 802.11b/g" dual protocol DSPAPs. Similarly, those DSPAPs can communicate with the overwhelmingly predominant 802.11b-only legacy NiCs, the (relatively rare) newer 802.11a-only NICs and the "802.11a, b or g" MPNICs.

BRIEF SUMMARY OF THE INVENTION

The invention described herein provides a structure, method and system to effectively utilize dual (2.4 and 5 GHz) hand, multiple (CCK and OFDM) protocol "802.11abg" radio technology to implement reduced cost and complexity, "simultaneous 802.11a and 802.11b/g Access Points" and related devices (collectively, "Multiprotocol Devices" or "MPDs"). The invention combines a framework and mechanism that specifically allows for production of three distinct types of MPDs: a "Multiprotocol AP", a "Multiprotocol Repeater" and a "High Capacity Multiprotocol Repeater".

The invention consists of two distinct, intimately related and ultimately inseparable component elements: 1) a novel and unique "Datagram Flow Structure", whereby WLAN data packets transmitted and received by an MPD are internally organized and routed, and 2) a novel and unique "MAC Methodology", whereby said data packets are then externally wirelessly exchanged between the MPD and other 802.11-compliant devices. A Multiprotocol Access Point ("MPAP"), the first principal claimed embodiment of this invention, provides concurrent 802.11a and 802.11b/g AP services to multiple distinct 802.11a or 802.11b/g capable WLAN stations while only employing a single 802.11abg radio and a wired connection to the infrastructure Distribution System ("DS"). In addition, the MPAP provides "virtual DS" connectivity to other associated "downstream" MPD devices with which it shares a dedicated portion of its wireless traffic.

A Multiprotocol Repeater ("MPR"), another key embodiment of this invention, is an MPD that also provides simultaneous 802.11a and 802.11b/g Access Point functionality to any and all associated single protocol WLAN stations, but with its "wired DS" port replaced by a "virtual DS wireless link" to another "upstream" MPD. An MPR also uses a single 802.11abg radio, and, like the MPAP, provides virtual DS connectivity to "further downstream" MPD devices.

A "High Capacity Multiprotocol Repeater" ("HCMPR"), the last claimed embodiment of this invention, is an MPR variant that uses one distinct 802.11abg (or an 802.11a-only) radio to provide the virtual DS wireless link and a separate 802.11abg radio to provide the 802.11a and 802.11b/g AP services to the associated distinct protocol stations as well the virtual DS wireless daisy chain link to other downstream MPDs. The simultaneous, "parallel" operation of the upstream 802.11a virtual DS link with the 802.11abg AP communications allows the HCMPR to support a greater volume of wireless traffic than can the MPR.

BRIEF DESCRIPTION OF THE DRAWINGS

The accompanying drawings, which are incorporated into and form part of this specification, illustrate key elements of the Multiprotocol Core invention as well as the three claimed embodiments of the same. These drawings, together with the detailed description following serve to fully explain the principles of the invention.

FIG. 3 presents a set of specific, distinct instantiations of the general MPCDFS presented in FIG. 2.

DETAILED DESCRIPTION OF THE INVENTION

Detailed reference will now be made to the specifics of the Multiprotocol Core invention as well as to its claimed embodiments. While the invention will be described together with the embodiments, it needs be understood that said embodiments are not intended to limit the scope of the invention in any way. On the contrary, the intention is to cover any and all alternatives, modifications and equivalents that may fall within the spirit and scope of the invention as defined by the appended claims.

Within the following detailed description of the invention numerous specific details are set forth in order to provide a thorough understanding of the same. However, it will be obvious to one of ordinary skill in the art that the present invention may be understood and practiced without taking recourse to these specific details. In other instances, well-known and understood methods, procedures, references, standards, protocols, systems and components have not been described in detail so not to unnecessarily obscure salient aspects of the invention.

Figure 1:
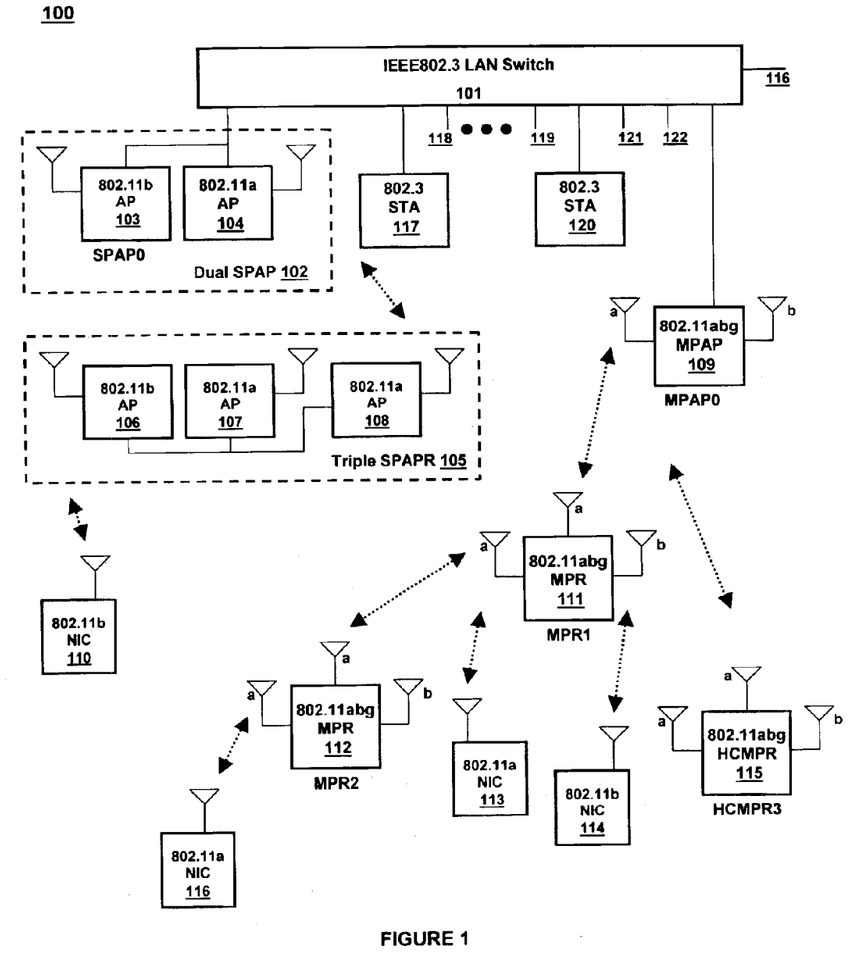
FIG. 1 is a block diagram of a representative WLAN deployment featuring a LAN infrastructure, legacy single-protocol NICs, single protocol-based APs and Repeaters, Multiprotocol APs and Multiprotocol Repeaters (both MPR and HCMPR versions).

FIG. 1 illustrates a representative Local Area Network ("LAN") 100 as deployed in many present-day large and medium sized businesses. The LAN Switch 101 is a piece of computer networking equipment that routes data packets (or "datagrams") between other high capacity networking equipment (indicated by the unconsummated connection 116) and computing or other networking devices connected to its ports (indicated by the consummated connections to devices 102, 109, 117 and 120 and by the unconsummated connections 118, 119, 121 and 122).

Device 102 is a representative "Dual Single Protocol Access Point" ("DSPAP") intended to provide simultaneous 802.11a and 802.11b/g AP functionality. DSPAP 102 consists of two independent, distinct, single-protocol Access Points 103 and 104, respectively. AP 103 within DSPAP 102 serves to bridge or route wirelessly transmitted datagrams conforming to the 802.11b WLAN standard between appropriately capable wireless stations (802.11b NICs, such as devices 110 and 114) and Switch 101. Similarly. AP 104 within DSPAP 102 serves to route wirelessly transmitted datagrams conforming to the 802.11a WLAN standard between appropriately capable wireless stations (802.11a NICs, such as devices 113 and 116) and Switch 101. DSPAP 102 is representative of the (excessive) cost and complexity involved when utilizing single protocol technology to implement multiple protocol APs.

Device 105 is a representative "Triple Single Protocol AP Repeater" ("TSPAPR") intended to provide simultaneous 802.11a and 802.11b AP functionality while incorporating a wireless (802.11a) connection back to the Distribution System. TSPAPR 105 consists of three independent, distinct, single-protocol Access Points 106, 107 and 108, respectively. 802.11b AP 106 Within TSPAPR 105 serves to bridge datagrams between associated 802.11b STAs and the DS port of the contained 802.11a AP 108. Similarly, 802.11a AP 107 within TSPAPR 105 serves to bridge datagrams between associated 802.11a STAs and AP 108's DS port. 802.11a AP 108 Within TSPAPR 105 then serves to bridge datagrams between its DS part and an associated "upstream" 802.11a- compliant AP device actually connected to the Infrastructure Distribution System. TSPAPR 105 is representative of the (unnecessarily extreme) cost and complexity involved when utilizing single protocol technology to implement multiple protocol repeater devices.

Devices 117 and 120 are networking-capable computing devices, connected directly to Switch 101 via fixed wiring or cable. The networking protocol used by devices 105 and 106 (as well as Switch 101) is IEEE 802.3 10/100 Base T Ethernet, and said devices are hereafter referred to as 802.3 STAs. Devices 117 and 120 serve merely to illustrate the non-wireless networking functionality supported by Switch 101.

Devices 110 and 114 are computing devices incorporating wireless stations ("STAs") conforming to the 802.11b WLAN standard. These devices are capable of networking wirelessly with single protocol 802.11b devices such as AP 103 (of DSPAP 102) and AP 106 (of TSPAPR 105) and with Multiprotocol Devices such as MPAP 109, MPRs 111 and 112 and HCMPR 115. Devices 113 and 116 are computing devices incorporating wireless STAs conforming to the 802.11a WLAN standard. These devices are capable of networking wirelessly with single protocol 802.11a devices such as AP 104 (of DSPAP 102) and AP 107 (of TSPAPR 105) and with Multiprotocol Devices such as MPAP 109. MPRs 111 and 112 and HCMPR 115.

Multiprotocol ("MP") Devices 109, 111, 112 and 115 represent the distinct claimed embodiments of the present Multiprotocol Core Invention. MP Device 109, representative of the first embodiment, is a Multiprotocol Access Point ("MPAP") capable of networking wirelessly with 802.11a and 802.11b or 802.11b/g STAs simultaneously. An MPAP provides the functionality of DSPAP 102 while using a single frequency-band agile (i.e., tunable to channels in both the 2.4 and 5 GHz bands). 802.11a and 802.11b/g capable (i.e., containing independently operating CCK and OFDM modems) radio device (hereafter, an "802.11abg radio") instead of dual single protocol APs.

MP Devices 111 and 112 are Multiprotocol Repeaters ("MPRs"), another Multiprotocol Core invention embodiment. These MPRs are capable of simultaneous wireless networking with associated 802.11a and 802.11b/g STAs and thereafter bridging said traffic wirelessly (using 802.11a) to another MP Device actually connected to the DS, in the fashion of TSPAPR 105. MPRs 111 and 112 each utilize a single 802.11abg radio to perform all their wireless networking functions.

MP Device 115, a different type of Multiprotocol Repeater, uses one 802.11abg radio for networking with its associated 802.11a and b/g stations and a separate 802.11abg or 802.11a radio for linking to the upstream MP Device. MP Device 115 is hereafter referred to as a "High Capacity" MPR ("HCMPR").

Detailed descriptions will now be made regarding the specifics of the Multiprotocol Core invention, that is, precisely how the innovations contained in the appended claims enable a Multiprotocol Access Point (MPAP 109), a Multiprotocol Repeater (MPR 111 or MPR 112) or a High Capacity Multiprotocol Repeater (HCMPR 115), each incorporating an 802.11abg radio and the Multiprotocol Core invention, to reproduce the functionality provided by multiple distinct 802.11a and 802.11b Access Points such as contained in DSPAP 102 and TSPAPR 105. It will be shown that such Multiprotocol functionality is enabled by incorporation of the two key Multiprotocol Core invention elements, the Multiprotocol Core Datagram Flow Structure ("MPCDFS") and the Multiprotocol Core Wireless Access Protocol ("MPCWAP").

Multiprotocol Core

As defined by 802.11 the standard, an Access Point ("AP") is any device containing an 802.11-conformant medium access control (MAC) and physical layer (PHY) interface to the wireless medium that provides wirelessly associated 802.11-compliant stations with access to the infrastructure Distribution System. Stated differently, an AP is a device incorporating one or more "wireless portals" and one (wired) Distribution System ("DS") portal whose function is to route externally originating data packets between any of its wireless portals and its DS portal. Any 802.11-compliant AP, then, incorporates some manner of datagram flow structure. The present invention covers devices that specifically incorporate the MPCDFS, or any claimed structure reduced and/or derived therefrom, to enable simultaneous multiple protocol 802.11 AP functionality, as described in the paragraphs below.

An Access Point also actively manages the wireless traffic between all the 802.11 stations with which it is associated. This is accomplished using standard 802.11-1997 MAC management and control wireless packet exchanges between the AP and the stations. The collection of specific packet exchange sequences that provide for stations to identify themselves as valid network participants, to join or leave the network, to set up and tear down individual wireless sessions and to manage the flow of individual packet transmissions between stations is generically referred to as a "wireless access protocol" or "WAP". IEEE 802.11-1997 describes a WAP between (single protocol) APs and stations. The Multiprotocol Core Invention described herein incorporates a set of innovative extensions to the 802.11 WAP (the MPCWAP) that defines the wireless access between MPCDFS-provisioned Multiprotocol Devices and single protocol stations, multiple protocol stations and/or other Multiprotocol Devices.

Multiprotocol Core Datagram Flow Structure (MPCDFS)

Figure 2:
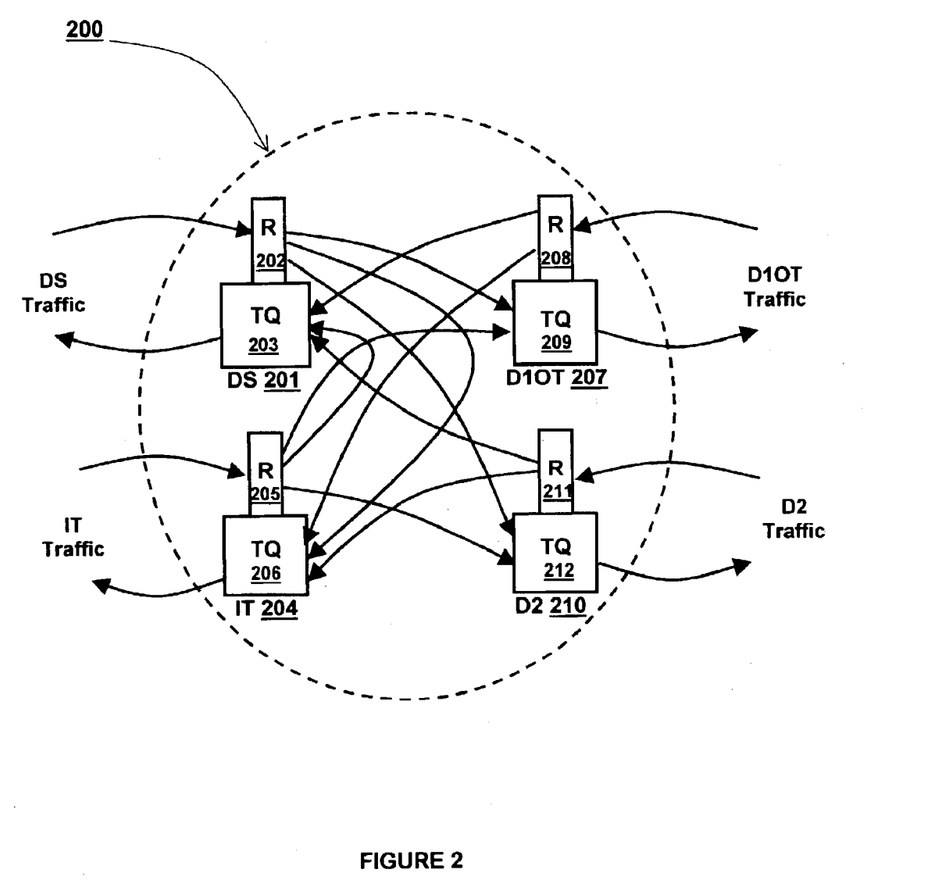
FIG. 2 is a schematic representation of the Multiprotocol Core Datagram Flow Structure (MPCDFS), itself incorporating the transmitted and received, wired and wireless data packet flow into, within and out from the data portals of a WLAN device incorporating the Multiprotocol Core invention.

FIG. 2 presents a diagram of the MPCDFS structure illustrating the data packet routing within a generalized Multiprotocol Device. Note that this MPCDFS, in addition to supporting its three specific claimed MP Device embodiments, is also readily reducible to a data flow structure characteristic of an unclaimed single protocol legacy 802.11-1997 AP. This Multiprotocol Core structure 200 of FIG. 2 consists of four distinct bidirectional portals, the DS portal 201, IT portal 204, D1OT portal 207 and the D2 portal 210.

The function of the DS portal is to service all traffic between the Multiprotocol Core 200 and the wired (LAN or otherwise) Infrastructure Distribution System ("IDS"). The bidirectional DS portal 201 consists of two unidirectional components, the receive buffer DS R 202 that accepts datagrams originating at the IDS and the transmit queue DS TQ 203 that buffers datagrams destined for the same.

The function of the IT portal is to service all traffic between the Multiprotocol Core 200 and a remote, wirelessly accessed IDS portal, specifically another Multiprotocol Device. The bi-directional IT portal 204 consists of two unidirectional components, the receive buffer IT R 205 that accepts datagrams from the remote Multiprotocol Device and the transmit queue IT TQ 206 that buffers datagrams destined for the same.

The function of the D1OT portal is to service all traffic between the Multiprotocol Core 200 and all its associated 802.11a-compliant stations, including, specifically, any downstream Multiprotocol Repeater devices. The bi-directional D1OT portal 207 consists of two unidirectional components, the receive buffer D1OT R 208 that accepts datagrams originating at the associated 802.11a stations and the transmit queue D1OT TQ 209 that buffers datagrams destined for the same.

The function of the D2 portal is to service all traffic between the Multiprotocol Core 200 and all its associated 802.11b/g-compliant stations. The bi-directional D2 portal 210 consists of two unidirectional components, the receive buffer D2 R 211 that accepts datagrams from the associated 802.11b/g stations and the transmit queue D2 TQ 212 that buffers datagrams destined for the same.

FIG. 2 also illustrates the permissible internal datagram routing between the four Multiprotocol Core 200 portals. Note that datagrams from DS R 202 may be routed to IT TQ 206, D1OT TQ 209 or D2 TQ 212. Similarly, datagrams from IT R 205 may be routed to DS TQ 203, D1OT TQ 209 or D2 TQ 212. Conversely, datagrams from D1OT R 208 may only be routed to DS TQ 203 or to IT TQ 206, and datagrams from D2 R 211 may only be routed to, again, DS TQ 203 or IT TQ 206.

The fundamental defining characteristic of the Multiprotocol Core structure 200 is that it supports the operational functionality of any 802.11 AP device, single protocol or multiple protocol, by selectively disabling one or more of its portals. Specifically, legacy 802.11-1997-compliant 802.11a, 802.11b or 802.11b/g Access Points as well as all the claimed MP Device embodiments can be modeled as specific reduced-complexity instantiations of the general MPCDFS.

For example, the Multiprotocol Core 200 supports 802.11b single protocol AP ("SPAP") functionality (for a physical device featuring an 802.11b-only radio) upon disabling of its IT 204 and D1OT 207 portals. IDS-originating packets appearing at DS R 202 are routed only to D2 TQ 212, and packets from associated 802.11b stations appearing at D2 R 211 are routed to DS TQ 203. Similarly, the Multiprotocol Core 200 supports 802.11a SPAP functionality by disabling its IT 204 and D2 210 portals. In this fashion, IDS-originating packets appearing at DS R 202 are routed exclusively to D1OT TQ 209, and packets from associated 802.11a stations appearing at D1OT R 208 are correspondingly routed to DS TQ 203.

Figure 3A:
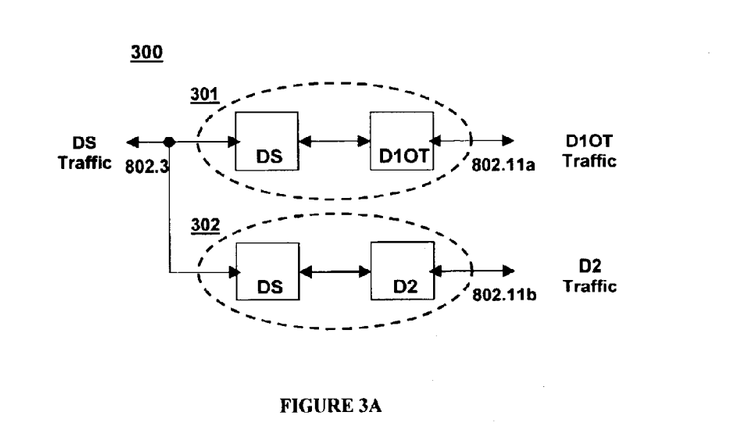
FIG. 3A presents the MPCDFS for a representative (unclaimed) Dual Single Protocol Access Point device consisting of two independent single protocol APs.

FIG. 3A illustrates the datagram flow structure for a representative Dual Single Protocol Access Point, DSPAP 300, applicable to a device such as Dual SPAP 102 of FIG. 1. DSPAP 300 consists of an 802.11a SPAP 301 and an 802.11b SPAP 302, interconnected at their DS ports.

Figure 3B:
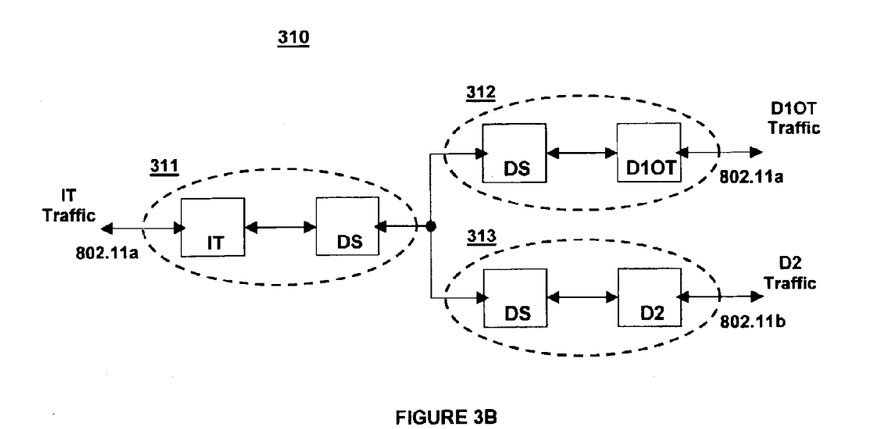
FIG. 3B illustrates the MPCDFS for a representative (also unclaimed) Triple Single Protocol AP Repeater consisting of three single protocol APs.

FIG. 3B illustrates the datagram flow structure for a representative Triple Single Protocol Access Point Repeater, TSPAPR 310, applicable to a device such as Triple SPAR 105 of FIG. 1. TSPAPR 310 consists of three independent single protocol APs: an 802.11a SPAP 311, another 802.11a SPAP 312 and an 802.11b SPAP 313.

Figure 3C:
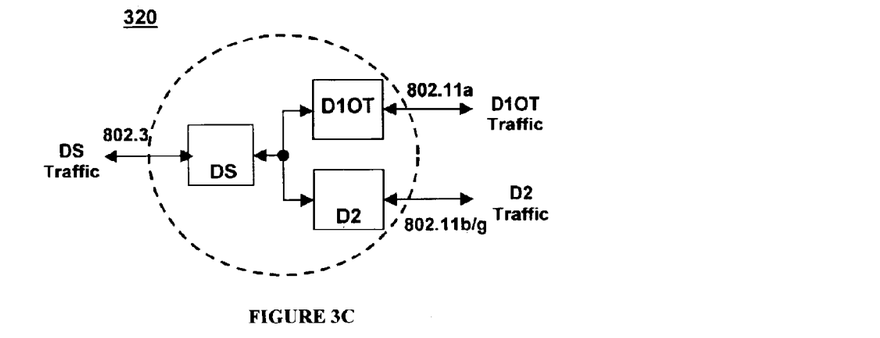
FIG. 3C shows the MPCDFS for a claimed Multiprotocol AP (MPAP).

Specific to a preferred embodiment of this invention, the Multiprotocol Core 200 structure supports Multiprotocol Access Point ("MPAP") functionality upon disabling its IT portal 204. In this fashion, IDS-originating packets appearing at DS R 202 are routed to the appropriate D1OT TQ 209 or D2 TQ 212 portals, depending if they correspond to associated 802.11a or 802.11b/g station traffic, respectively. Datagrams originating at associated 802.11a stations appearing at D1OT R 208, as well as datagrams from associated 802.11b/g stations appearing at D2 R 211 are correspondingly routed to DS TQ 203. FIG. 3C illustrates the datagram flow structure for al representative MPAP 320.

Figure 3D:
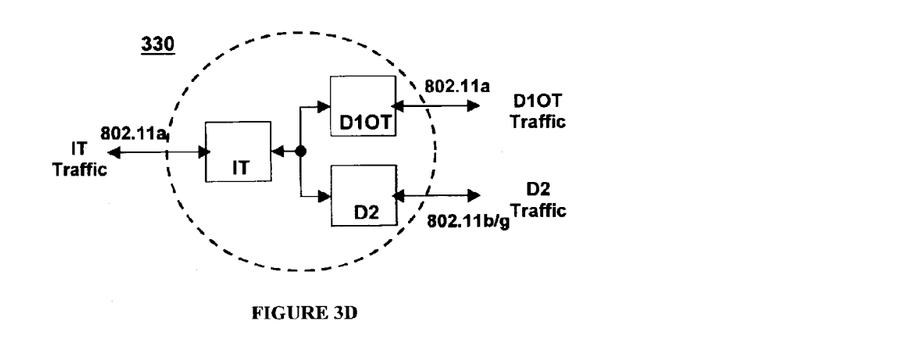
FIG. 3D presents the MPCDFS for a claimed Multiprotocol Repeater (MPR) and FIG. 3E presents the specific MPCDFS of a claimed High Capacity Multiprotocol Repeater (HCMPR).

Specific to another embodiment of this invention, the Multiprotocol Core 200 supports Multiprotocol Repeater (MPR) functionality by disabling its DS portal 201. In this fashion, IT packets originating at the upstream MP Device appearing at IT R 205 are routed to the appropriate D1OT TQ 209 or D2 TQ 212, depending if they correspond to associated 802.11a or 802.11b/g station traffic, respectively. Datagrams from associated 802.11a stations appearing at D1OT R 208, as well as datagrams from associated 802.11b/g stations appearing at D2 R 211 are correspondingly routed to IT TQ 206. FIG. 3D illustrates the datagram flow structure for a representative MPR 330.

Specific to the last embodiment of this invention, the Multiprotocol Core 200 supports High Capacity Multiprotocol Repeater (HCMPR) functionality by conjoining two independent Multiprotocol Core 200-based structures, an 802.11abg radio-associated MPAP as described above plus an 802.11a radio-associated "Slave SPAP", at their DS ports and selectively disabling portals within each structure as described below.

The HCMPR Slave SPAP ("SSPAP") is a single protocol MPCDFS implementation that serves to route datagrams between the MP Device's IT portal and its DS portal. Referring back to FIG. 2, the SSPAP is an MPCDFS with its D1OT 207 and D2 210 wireless portals disabled, such that incoming traffic at DS R 202 is routed to IT TQ 206 and incoming traffic at IT R 205 is routed to DS TQ 203.

The HCMPR MPAP is identically the MPCDFS Multiprotocol Access Point instantiation as described in the paragraphs above, and illustrated in FIG. 3C as MPAP 320.

Figure 3E:
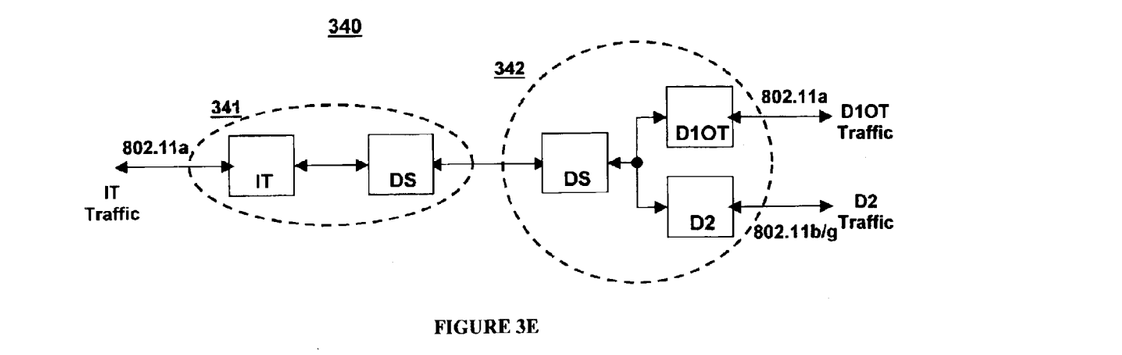

FIG. 3E illustrates the combination of the SSPAP 341 and MPAP 342 datagram flow structures to produce a representative High Capacity Multiprotocol Repeater HCMPR 340. As indicated therein, 802.11a packets originating at the upstream MP device appearing at the SSPAP 341 IT receive buffer are routed to its DS transmit queue, at which point they are forwarded directly to the conjoined MPAP's DS receive buffer for immediate routing to its D1OT 802.11a or D2 802.11b/g transmit queues, as appropriate.

Correspondingly, datagrams from associated 802.11a or 802.11b/g stations appearing at the HCMPR's MPAP D1OT or D2 wireless portals, respectively, are routed directly to its DS transmit queue, at which point they are forwarded to the conjoined SSPAP's DS receive buffer for subsequent routing to its IT transmit queue for 802.11a transmission to the upstream Multiprotocol Device.

Multiprotocol Core Wireless Access Protocol (MPCWAP)

The following is a description of the wireless access protocol used by a generalized Multiprotocol Device. Specific MPCWAP instantiation descriptions then follow for each of the claimed Multiprotocol Device embodiments.

By virtue of the MPCDFS, any given Multiprotocol Device may have datagrams queued and ready to transmit at any of its wireless portals at any given instant in time. As each wireless portal is assigned a distinct frequency channel of operation (within either the 2.4 or 5 GHz bands) a single frequency-band-agile-radio Multiprotocol Device sequences between its wireless portal channels in order to appropriately transmit its queued datagrams as well as receive any incoming packets.

Specifically, the MP device initially tunes its frequency band agile radio to a selected portal's RF channel assignment. The radio remains tuned to that channel long enough for the MP device to enable on-channel traffic by transmitting an appropriate 802.11 management/control frame, transmit the contents of the portal's transmit queue, dwell further to allow for receipt of any incoming datagrams or for transmission of late-arriving queued packets, and then finally suspend on-channel traffic by transmitting another appropriate management/control frame. The MP device then tunes the radio to the RF channel assigned to the next portal, where the wireless datagram enabling, traffic exchange and suspension takes place once again.

In this fashion, MPAP devices alternate between their two D1OT 802.11a and D2 802.11b/g channels, MPRs alternate between their three IT 802.11a, D1OT 802.11a and D2 802.11b/g channels, and HCMPRs alternate between their two (MPAP) D1OT 802.11a and D2 802.11b/g channels, as the (SSPAP) IT radio remains fixed-tuned to the appropriate IT 802.11a channel.

This cycling between the portal channels is defined, by convention, over a global "Beacon Interval" consisting of sequential, distinct wireless portal-specific "Access Intervals" ("AIs") plus non-zero-time radio "Tuning Periods". The Beacon Interval cycling continues for as long as the MP Device remains operational, as 802.11a (including other MP devices) and 802.11b/g stations may independently join and/or leave the MP device-managed wireless network as well The 802.11-1997 MAC Wireless Access Protocol defines a set of specific management/control frame exchanges between an AP and a Station that provide for network access, session setup and datagram traffic control. These wireless datagrams include network access frames such as "Authentication Request", "Authentication Response" and "Deauthentication" packets, session setup frames such as "Probe Request", "Probe Response", "Association Request", "Association Response", and "Disassociation" packets and traffic control frames such as "Beacon", "Request to Send", "Clear to Send", "Contention-Free End", and "ACK" packets. Of particular relevance to the Multiprotocol Core invention, and fundamental to the Multiprotocol Core Wireless Access Protocol MPCWAP are two specific 802.11-1997 MAC frames that can he innovatively used to start and suspend all wireless activity as needed on a specific radio channel, the "Beacon" management frame and the "Contention-Free End" control frame.

Figure 4:
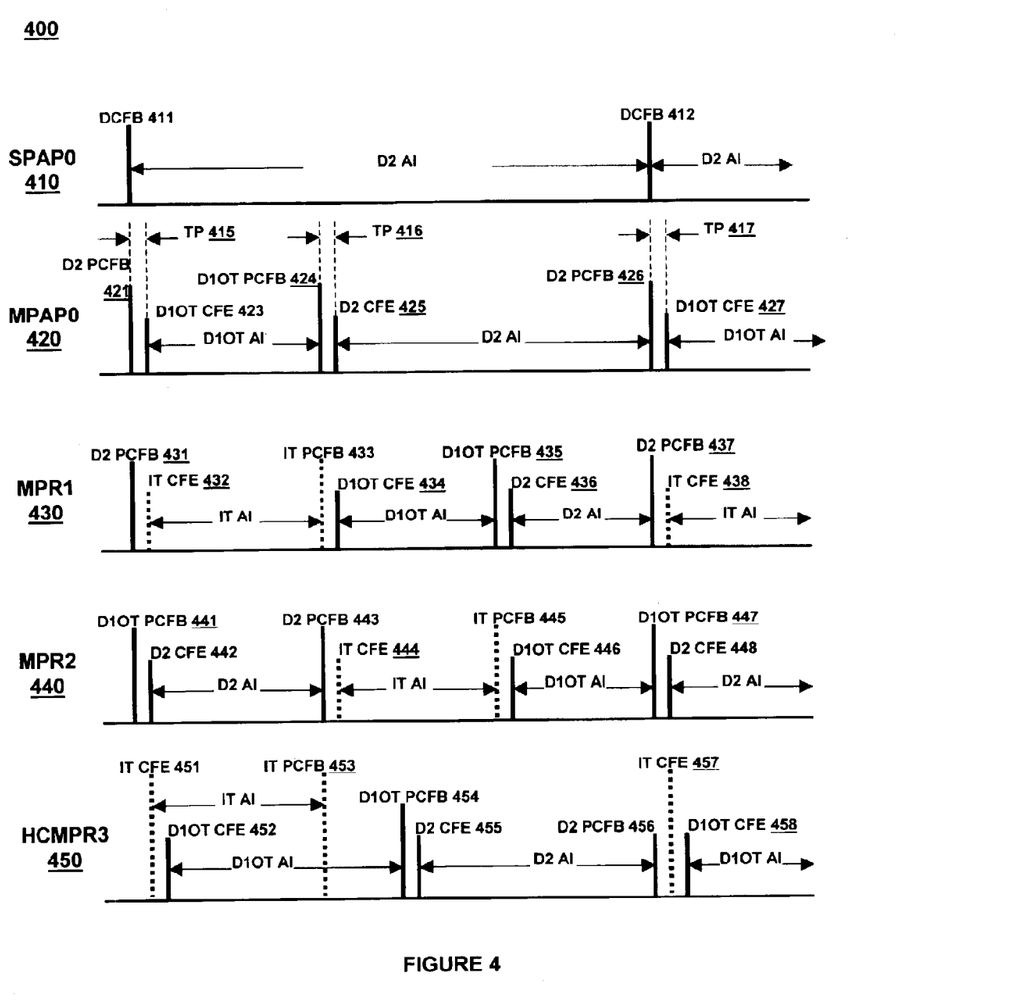
FIG. 4 is a timing diagram of the Multiprotocol Core Wireless Access Protocol. It illustrates management and control datagrams transmitted by different types of Access Point devices, including a legacy single-protocol AP, the claimed MPAP, the claimed MPR and the claimed HCMPR.

FIG. 4 presents a set of timing diagrams that illustrate details of the MPCWAP operation as applicable to the MPAP, MPR and HCMPR embodiments. In addition, a timing diagram for a representative legacy single protocol AP device is included, and it is instructive to begin any detailed description of MPCWAP with precisely the operation of a (legacy) single protocol AP.

As has been noted previously, the operation of a legacy 802.11-1997 single protocol AP may be viewed as a special case of Multiprotocol Device operation. Specifically, the SPAP Beacon Interval consists of one AI associated with its single wireless (802.11a D1OT or 802.11b/g D2) portal. Also, as a single protocol device by definition always operates on the same channel, no radio retuning is necessary and therefore the Tuning Period is identically zero. The resulting timing datagram SPAP0 410 of FIG. 4 applies to such an SPAP device, for example 802.11b/g AP 103 (SPAP0) within Dual SPAP 102 in FIG. 1. Note in timing diagram SPAP0 410 of FIG. 4 that the Beacon Interval corresponds to a single D2 AI, the beginning and end of which is delimited by a standard 802.11-1997 MAC management frame of subtype "Beacon". This Beacon frame is, in turn, further specified as signaling "Distributed Coordination Function" operation, will be hereafter referred to as a "DCFB" frame, and is represented in FIG. 4 SPAP0 410 by DCFB 411 and DCFB 412.

Since the SPAP0 D2 AI duty cycle is practically 100%, any datagrams (including all management control and data frames) internally routed to AP 103's D2 transmit queue are made immediately available for transmission, and, correspondingly, any associated (802.11b/g) wireless station is cleared to transmit (management, control and data) frames in SPAP0 at any time. The wireless access protocol for an 802.11b/g SPAP is, therefore, fully represented by the timing diagram SPAP 410 of FIG. 4.

Timing diagram MPAP0 420 of FIG. 4 illustrates the MPCWAP operation of a representative Multiprotocol AP such as MPAP 109 of FIG. 1 (also designated hereafter as MPAP0). Being a Multiprotocol Access Point, its forever-repeating Beacon Interval consists of two distinct Access Intervals, a D1OT AI plus a D2 AI, separated by identical non-zero Tuning Periods (TP 415, TP 416 and TP 417).

Key to the MPCWAP, the beginning and end of each Access Interval are signaled by distinct, existing, standard 802.11-1997 management/Control frames, innovatively invoked in a fashion that strictly limits transmissions from the associated (D1OT 802.11a or D2 802.11b/g) wireless stations to their corresponding (D1OT or D2) AIs, and effectively prohibits transmissions at all other times. These frames must be unambiguously interpreted as "Start Traffic" and "Stop Traffic" commands, respectively, by any and all 802.11 stations, including legacy devices already deployed, operating and presently in use.

Notwithstanding the fact that they were not expressly designed to provide such functionality, two standard, existing 802.11 MAC management and control frames can indeed be used as the above "Start traffic" and "Stop Traffic" commands. Per 802.11-1997, upon AP transmission of an 802.11-1997 MAC management frame of subtype "Beacon", where said Beacon frame (hereafter referred to as a "PCFB" frame) appropriately asserts its contained "Capabilities" and "CF Parameter Set" "Information Elements" to signal "Point Coordination Function operation with no polling and a 1 second, minimum, Contention-free Period maximum duration", any and all stations associated with said AP must defer any and all independently originating transmissions until after receipt of an appropriate, subsequent "Contention-Free End" ("CFE") frame from said AP. Therefore, by convention, the MPCWAP signals the start of any MP Device wireless portal AI by a transmission at a CFF frame, and correspondingly signals the end of the same AI by transmission of a PCFB frame.

Referring back to timing diagram MPAP0 420 of FIG. 4, the first D1OT AI (corresponding to transmissions on its assigned 802.11a 5 GHz band channel) is delimited by a start-traffic frame D1OT CFE 423 and a stop-traffic frame D1OT PCFB 424. During the D1OT AI the D1OT transmit queue is emptied of all buffered packets, which are transmitted to associated 802.11a stations and any downstream MP Repeaters. In addition, any traffic originating from the associated stations and/or downstream Multiprotocol Repeaters is accepted at the D1OT receive buffer and forwarded to MPAP0's DS portal.

After a Tuning Period TP 416 (during which the device tunes from the 5 GHz band D1OT channel to its assigned 802.11b/g 2.4 GHz band D2 channel) MPAP0 transmits a D2 CFE 425 to signal the beginning of the D2 AI. D2 traffic enabled, the D2 transmit queue is flushed of all buffered packets, which are appropriately transmitted to the associated 802.11b/g stations, and any incoming datagrams from the 802.11b/g stations are received and processed at the D2 receive buffer. The D2 AI is then appropriately terminated upon MPAP0 transmission of D2 PCFB 426.

After another Tuning Period TP 417 (wherein MPAP0 tunes back to the 5 GHz D1OT channel) the next D1OT AI begins with a D1OT CFE 427, and 802.11a 5 GHz D1OT traffic suspended by the previous D1OT PCFB 424 is permitted to resume. Any D1OT packets queued since the end of the previous D1OT AI are transmitted and any incoming 802.11a packets are correspondingly received and forwarded to the IDS.

Incorporating MPCWAP as described above and correspondingly depicted in timing diagram MPAP0 420, in conjunction with the MPAP MPCDFS structure, a device such as MPAP0 plainly enables and supports simultaneous 802.11a and 802.11b/g Access Point operation using a single 802.11abg radio.

The MPCWAP algorithm presented above readily extends and applies to the Multiprotocol Repeater. The principal discriminating characteristic between an MPR and an MPAP is the Multiprotocol Repeater's wireless connection (using an MPCDFS IT wireless portal) to a "virtual IDS" that in fact consists of another MP Device (either an MPAP or another MPR). An MPR's Beacon Interval, therefore, consists of three distinct wireless portal Access Intervals, an IT AI, a D1OT AI and a D2 AI, each separated by identical non-zero Tuning Periods.

By convention, the upstream MP Device dedicates its 5 GHz 802.11a D1OT portal to the wireless connection with the MPR's IT portal (therefore set to operate, via configuration, on the identical 5 GHz channel). Also by convention, the MPR's IT AI is determined by and set identically to the upstream MP Device's D1OT AI, or, equivalently stated, the MPR's IT AI delimiters IT CFE and IT PCFB identically correspond to the upstream MP Device's D1OT CFE and D1OT PCFB. By convention, therefore, an MPR does not actually transmit IT AI delimiters. It instead designates the D1OT CFE and D1OT PCFB frames received from the upstream MP device as its own equivalent IT CFE and IT PCFB packets, respectively.

Timing diagram MPR1 430 of FIG. 4 illustrates the MPCWAP operation of a representative Multiprotocol Repeater such as MPR 111 of FIG. 1 (also designated hereafter as MPR1). Note that the MPR1 IT AI (delimited by the dashed IT CFE 432 and IT PCFB 433) corresponds exactly to the to the D1OT AI of MPAP0 420. This illustrates the linkage between an MPR and its upstream MP Device, in this case an MPAP.

During MPAP0's D1OT AI (equivalently MPR1's IT AI) the devices exchange the contents of their D1OT and IT transmit queues, respectively, and emulate (albeit with added latency) a direct connection between MPR1's wireless portals and MPAP0's DS portal. Specifically, during MPR1's IT AI any packets (originating at MPAP0's D1OT portal) appearing at MPR1's IT receive buffer are routed to its D1OT or D2 transmit queues, as appropriate, for subsequent transmission during the next corresponding D1OT or D2 access intervals. Correspondingly, any packets buffered at MPR1's transmit queue are flushed and transmitted directly to MPAP0. MPR1's IT AI ends upon MPAP0's transmission of D1OT PCB 424 (equivalently, MPR1 IT PCFB 433). MPR1 then tunes within a Tuning Interval (left undesignated for simplicity) from the 5 GHz 802.11a IT channel to the distinct 5 GHz 802.11a D1OT channel.

Settled upon the new channel, MPR1 transmits D1OT CFE 434 to enable D1OT exchanges with its associated 802.11a stations, including any downstream MPRs (and particularly, as will be discussed below, with MPR2). Specifically, during MPR1's D1OT AI any packets buffered at its D1OT transmit queue are flushed and transmitted to the appropriate 802.11a client stations, and any packets from an associated 802.11a station appearing at MPR1's D1OT receive buffer are routed to its IT transmit queue for subsequent transmission to the upstream device during the next IT AI. MPR1 ends the D1OT AI upon transmitting D1OT PCFB 435, and then tunes to its assigned 2.4 GHz 802.11b/g D2 channel.

Tuning period elapsed and MPR1 settled on the 2.4 GHz channel, MPR1 then transmits D2 CFE 436 to enable D2 AI traffic with its associated 802.11b/g stations. Specifically, during MPR1's D2 AI any packets buffered at its D2 transmit queue are flushed and transmitted to the appropriate 802.11b/g client stations, and any packets from an associated 802.11b/g station appearing at MPR1's D2 receive buffer are routed to its IT transmit queue for subsequent transmission back upstream during the next IT AI. MPR1 ends the D2 AI by transmitting D2 PCFB 437. MPR1 then tunes once again to its 5 GHz IT channel to listen for MPAP0's D1OT CFE 427 transmission and thereupon begin its MPCWAP cycle once again.

Timing diagram MPR2 440 illustrates the operation of another Multiprotocol Repeater MPR2 associated with and downstream to MPR1. Note that MPR2's IT CFE 444 and IT PCFB 445 correspond exactly to MPR1's D1OT. CFE 434 and D1OT PCFB 435, respectively, demonstrating the master-slave wireless linkage between the upstream MPR1 and the downstream MPR2. MPR2's MPCWAP operation is otherwise identical to that of MPR1. Further examination of and reflection upon timing diagrams MPR1 430 and MPR2 440 show that MPRs may be daisy-chained indefinitely in this fashion to provide appropriate, location-distributed Access Point functionality to their particularly associated 802.11a and 802.11b/g stations, limited only by the aggregate bandwidth demands of the collective associated stations.

Incorporating MPCWAP as described above and depicted in Timing Diagrams MPR1 430 and MPR2 440, respectively, in conjunction with the MPR MPCDFS structure, then, devices such as MPR1 and MPR2, each using a single 802.11abg radio, plainly enable and support simultaneous 802.11a and 802.11b/g Repeater operation.

A High Capacity Multiprotocol Repeater such as HCMPR 115 of FIG. 1 (hereafter also designated as HCMPR3) incorporates the MPCWAP algorithm in a different fashion than does an MPR. Specifically, since an HCMPR's MPCDFS is modeled as a distinct "Slave SPAP" structure (uniquely providing the IT wireless portal functionality) interconnected with a separate MPAP structure (in turn providing the D1OT and D2 wireless portals), the HCMPR MPCWAP may also be modeled as an SSPAP MPCWAP operating in parallel with the above-described MPAP MPCWAP.

As a specific example, HCMPR 115 (hereafter, HCMPR3) of FIG. 1 is shown associated downstream to MPAP 109 (MPAP0). FIG. 3E shows HCMPR3's composite MPCDFS structure 340 incorporating structures SSPAP 341 and MPAP 342. Timing Diagram HCMPR3 450 of FIG. 4 shows the composite HCMPR3 MPCWAP resulting from the corresponding combination of the SSPAP and MPAP wireless access protocols.

Timing diagram HCMPR3 450 is best interpreted as a superimposition of the device's SSPAP MPCWAP over its MPAP MPCWAP. Specifically, the HCMPR3 SSPAP provides the IT wireless portal and is therefore responsible for the IT wireless access protocol. Correspondingly, the HCMPR3 MPAP provides the D1OT and D2 Wireless portals and therefore manages the corresponding CFE and PCFB transmissions defining the D1OT and D2 WAPs.

As in the case of the basic MPR, HCMPR3's SSPAP IT wireless portal operation is slaved to the D1OT operation of the upstream MP Device MPAP0, that is, its IT CFE and IT PCFB delimiters actually correspond to the D1OT CFE and D1OT PCFB transmissions from MPAP0. Note in FIG. 4 that the SSPAP's IT CFE 451 and IT PCFB 453 of timing diagram. HCMPR3 450 correspond exactly to MPAP0 420's D1OT CFE 423 and D1OT PCFB 424, respectively.

HCMPR3's SSPAP operation, therefore, consists of appropriately interpreting MPAP0's D1OT CFE 423 and D1OT PCFB 424 transmissions as its own IT CFE. 451 and IT PCFB 453 AI delimiters, and supporting wireless datagram exchanges exclusively with MPAP0 during that interval. In addition, incoming HCMPR3 IT traffic appearing at the SSPAP's IT receive buffer is routed to its DS portal and passed on to HCMPR3's MPAP DS portal, and any datagrams from the MPAP DS portal pass through the SSPAP's DS receive buffer to its IT transmit queue for transmission, if possible, during the same HCMPR3 IT AI. IT AI terminated by MPAP0 PCFB 424, HCMPR3 ceases all IT wireless activity (although it continues any inter- and intra-SSPAP and MPAP datagram routing until completion) and waits for the next MPAP0 D1OT CFE 427 start transmission to enable IT exchanges again.

HCMPR3's MPAP operation occurs concurrently (in parallel) with its SSPAP operation, as illustrated in timing diagram HCMPR3 450 of FIG. 4. By convention, the HCMPR3 MPAP has tuned its 802.11abg radio to the designated 5 GHz D1OT 802.11a RF channel and starts its D1OT AI by transmitting D1OT CFE 452 immediately upon registering receipt of the HCMPR3 SSPAP's IT CFE 451. During the D1OT AI HCMPR3 exchanges wireless datagrams with its associated 802.11a stations, including any other associated downstream MP Repeaters. Also, any datagrams appearing at HCMPR3's MPAP D1OT receive buffer are routed to its DS transmit queue for immediate transfer to HCMPR3's SSPAP DS portal. Similarly, packets from the SSPAP DS portal appearing at the HCMPR3 MPAP DS receive buffer are immediately routed to its D1OT transmit queue for transmission. D1OT AI timed out upon D1OT PCFB 454 transmission, the HCMPR3 MPAP block then tunes its 802.11abg radio to the appropriate 2.4 GHz D2 802.11b/g RF channel to enable D2 operation.

HCMPR3 MPAP radio settled on-channel at 2.4 GHz, the device transmits D2 CFE 455 to begin its D2 AI. During the D2 AI HCMPR3 exchanges wireless datagrams with its associated 802.11b/g stations. Also, any datagrams appearing at HCMPR3's MPAP D2 receive buffer are routed to its DS transmit queue for immediate transfer to HCMPR3's SSPAP DS portal. Similarly, packets from the HCMPR3 SSPAP DS portal appearing at the MPAP DS receive buffer are immediately routed to its D2 transmit queue for transmission. D2 AI timed out upon D1OT PCFB 456 transmission, the HCMPR3 MPAP then tunes its 802.11abg radio back to the 5 GHz D2 802.11b/g RF channel to enable D1OT operation once again.

HCMPR3's composite, dual 802.11abg radio SSPAP and MPAP MPCDFS structure, coupled with the time-overlapping IT and D1OT/D2 Access Intervals provided by the parallel SSPAP and MPAP MPCWAPs provide an HCMPR MP device with more "air time" for IT, D1OT and D2 wireless exchanges than is available to a single radio MPR. The HCMPR device therefore supports a higher volume of 802.11 transmissions than can the MPR, and, ergo, therefrom derives its name.

Incorporating the MPCWAP operation as described in the paragraphs above and depicted in timing diagram HCMPR3 450, then, a Multiprotocol device such as HCMPR3, featuring two distinct 802.11abg radios and appropriate, corresponding SSPAP and MPAP MPCDFS implementations, plainly enables and supports simultaneous 802.11a and 802.11b/g Repeater operation.

The above descriptions of a general Multiprotocol Core construct consisting of a Multiprotocol Core Datagram Flow Structure and a Multiprotocol Core Wireless Access Protocol, and the subsequent incorporation and application of the same into three specific Multiprotocol Core device embodiments (the Multiprotocol Access point, the Multiprotocol Repeater and the High Capacity Multiprotocol Repeater) provide all the necessary and sufficient information to define the present invention.

What is claimed is:

1. An IEEE 802.11 compliant wireless local area network (WLAN) multiprotocol device comprising:
   one frequency band agile, complementary code keying (CCK) and orthogonal frequency division multiplex (OFDM) modulation-capable radio;
   a data flow structure framework which organizes and routes transmitted and received WLAN data packets within the multiprotocol device; and
   a medium access control (MAC) mechanism which wirelessly exchanges the data packets between the multiprotocol device and other IEEE 802.11 compliant devices,
   wherein the device is capable of engaging in simultaneous 802.11a and 802.11b/g WLAN communications.

2. The multiprotocol device of claim 1 wherein:
   the data flow structure comprises one wired portal and three or more wireless portals, each portal consisting of a transmit queue and an associated receive buffer; and interconnections between the distinct wired and wireless portal receive buffers and transmit queues such that any WLAN data packet externally deposited at the wired portal receive buffer is internally routed to one appropriate wireless portal transmit queue, and any data packet externally deposited at a wireless portal receive buffer is internally routed to one appropriate wired portal or other wireless portal transmit queues, and
   the MAC mechanism provides for distinct, sequential time intervals assigned to each wireless portal, only during which data packets can be transmitted from or received at the respective wireless portal, and where each time interval includes a beginning and end indicated by specific, standard 802.11 MAC management or control data packets.

3. The multiprotocol device of claim 2, wherein
   one of the wireless portals is disabled such that any data packet externally deposited at either of the two remaining enabled wireless portal receive buffers is internally routed to the wired portal transmit queue, and any data packet externally deposited at the wired portal receive buffer is internally routed to an appropriate one of the two remaining enabled wireless portal transmit queues, and
   wherein all wireless communications conforming to the IEEE 802.11a standard are routed through one of the enabled wireless portals on one 5 GHz band RF channel, and
   wherein all wireless communications conforming to the IEEE 802.11b/g standards are routed through the other remaining enabled wireless portal on one 2.4 GHz band RF channel, and
   wherein the multiprotocol device, referred to as a multiprotocol access point, complies with all relevant IEEE 802.11 WLAN standards regarding access point devices.

4. The multiprotocol device of claim 2 wherein the multiprotocol device is coupled to and configured to communicate with one separate upstream multiprotocol device, and
- wherein the wired portal is disabled and any data packet externally deposited at a first of the three wireless portal receive buffers is internally routed to an appropriate transmit queue of a second or a third wireless portal, and any data packet externally deposited at the receive buffer of the second or third wireless portal is internally routed to the transmit queue of the first wireless portal, and
- wherein all wireless communications routed through the first of the three wireless portals conform to the IEEE 802.11a standard and occur on a same 5 GHz band RF channel as that used by a wireless portal of the upstream multiprotocol device, and
- wherein all wireless communications routed through the second of the three wireless portals conform to the IEEE 802.11a standard and occur on a 5 GHz band RF channel likely, but not necessarily, distinct from the channel used by the first wireless portal, and
- wherein all wireless communications routed through the third of the three wireless portals conform to the IEEE802.11b/g standard and occur on a 2.4 GHz band RF channel, and
- wherein the multiprotocol device, referred to as a multiprotocol repeater, complies with all relevant IEEE 802.11 WLAN standards regarding access point devices.

5. A combination multiprotocol device comprising:

a first multiprotocol device of claim 2 and a second multiprotocol device of claim 2, the second multiprotocol device being different from the first multiprotocol device,

- wherein the first multiprotocol device is coupled to and configured to communicate with one separate upstream multiprotocol device and
- wherein the first multiprotocol device has two wireless portals disabled such that any data packet deposited at its wired portal receive buffer is routed to the remaining wireless portal transmit queue, and any data packet externally deposited at the wireless portal receive buffer is routed to the wired portal transmit queue, and
- wherein the second multiprotocol device has one wireless portal disabled, such that any data packet externally deposited at its wired portal receive buffer is internally routed to the transmit queue of one of its remaining enabled wireless portals, as appropriate, and that any wireless data packet externally deposited at either of the two remaining enabled wireless portal receive buffers is internally routed to its wired portal transmit queue, and
- wherein the first and second multiprotocol devices are mutually interconnected at their wired portals, such that packets at the first multiprotocol device's wired portal transmit queue are routed to the second multiprotocol device's wired portal receive buffer, and that packets at the second multiprotocol device's wired portal transmit queue are routed to the first multiprotocol device's wired portal receive buffer, and
- wherein all wireless communications routed through the first multiprotocol device's wireless portal conform to the IEEE 802.11a standard and occur within the same 5 GHz band RF channel as that used by a wireless portal of the upstream multiprotocol device, and
- wherein all wireless communications routed through one of the second multiprotocol device's wireless portals conform to the IEEE 802.11a standard and occur within a 5 GHz band RF channel likely, but not necessarily, distinct from the channel used by the first multiprotocol device's wireless portal, and
- wherein all wireless communications routed through the other second multiprotocol device's wireless portal conform to the IEEE802.11b/g standard and occur within one 2.4 GHz band RF channel and
- wherein the combination multiprotocol device, referred to as a high capacity multiprotocol repeater, complies with all relevant IEEE 802.11 WLAN standards regarding access point devices.

* * * * *